United States Patent
Sato et al.

(10) Patent No.: US 6,742,622 B2
(45) Date of Patent: Jun. 1, 2004

(54) MOLDED FOAM RESIN, PROCESS FOR FORMING THE SAME AND SPEAKER DIAPHRAGM CONSISTING OF THE SAME

(75) Inventors: Masatoshi Sato, Yamagata (JP); Yoshitaka Kobayashi, Yamagata (JP); Jiro Nakazono, Yamagata (JP)

(73) Assignees: Pioneer Corporation, Tokyo (JP); Tohoku Pioneer Corporation, Yamagata (JP)

(*) Notice: Subject to any disclaimer, the term of this patent is extended or adjusted under 35 U.S.C. 154(b) by 35 days.

(21) Appl. No.: 09/984,512

(22) Filed: Oct. 30, 2001

(65) Prior Publication Data

US 2002/0027040 A1 Mar. 7, 2002

Related U.S. Application Data

(62) Division of application No. 09/519,884, filed on Mar. 6, 2000.

(30) Foreign Application Priority Data

Mar. 4, 1999 (JP) ............................................. 11-56636

(51) Int. Cl.[7] .............................. H04R 7/00; B29D 9/00
(52) U.S. Cl. ........................ 181/167; 181/169; 181/170; 264/51; 264/45.5
(58) Field of Search .................. 264/41–51, 328.7, 264/411, 296, 52–55; 181/169, 170, 173, 296, 167, 164, 174, 157, 117

(56) References Cited

U.S. PATENT DOCUMENTS

| | | | | |
|---|---|---|---|---|
| 3,767,742 A | * | 10/1973 | Robin | 284/45.2 |
| 3,834,486 A | | 9/1974 | Tsuge et al. | 181/170 |
| 4,154,784 A | * | 5/1979 | Ruhl | 264/45.5 |
| 4,395,597 A | * | 7/1983 | Suzuki et al. | 181/170 |
| 5,793,002 A | | 8/1998 | Sato et al. | 181/169 |
| 5,900,198 A | * | 5/1999 | Hori | 264/50 |
| 6,030,561 A | * | 2/2000 | Sato et al. | 264/51 |
| 6,334,504 B1 | * | 1/2002 | Sato et al. | 181/167 |
| 2003/0024763 A1 | * | 2/2003 | Hachiya et al. | 181/169 |

FOREIGN PATENT DOCUMENTS

| | | | |
|---|---|---|---|
| DE | 2758924 A1 | 7/1978 | |
| DE | 19626813 C2 | 4/1997 | |
| DE | 19705758 A1 | 10/1997 | |
| EP | 0839624 B1 | 5/1998 | |
| JP | 57063995 A * | 4/1982 | H04R/7/10 |
| JP | 8-207074 | 8/1996 | |
| JP | 8-340594 | 12/1996 | |

* cited by examiner

*Primary Examiner*—Rina Duda
*Assistant Examiner*—Patrick Miller
(74) *Attorney, Agent, or Firm*—Sughrue Mion, PLLC

(57) ABSTRACT

A molded foam resin, surface of which can be designed easily at low cost, a process for forming a molded foam resin, and a speaker diaphragm made of molded foam resin are provided, in which a molded foam resin is formed by injection molding of foaming agent-containing resin and has a foamed zone having a three layer-structure consisting of a foamed layer inside and a non-foamed layer outside and a non-foamed zone having a single layer-structure consisting of a non-foamed layer. The process for forming the molded foam resin according to the present invention includes the steps of injecting a foaming agent-containing resin into a mold and opening the mold after a lapse of a designated period of time after the completion of the injection, in which a cavity of the mold contains a thick space corresponding to the foamed zone and a thin space corresponding to the non-foamed zone, and the designated period of time is chosen so that a curing of the resin filled into the thin space is completed and a curing of the resin filled into the thick space is not completed. Thus, a molded foam resin and a speaker diaphragm according to the present invention can be thinned, designed with different tone of color on surfaces thereof and lightened without deteriorating stiffness thereof.

5 Claims, 9 Drawing Sheets

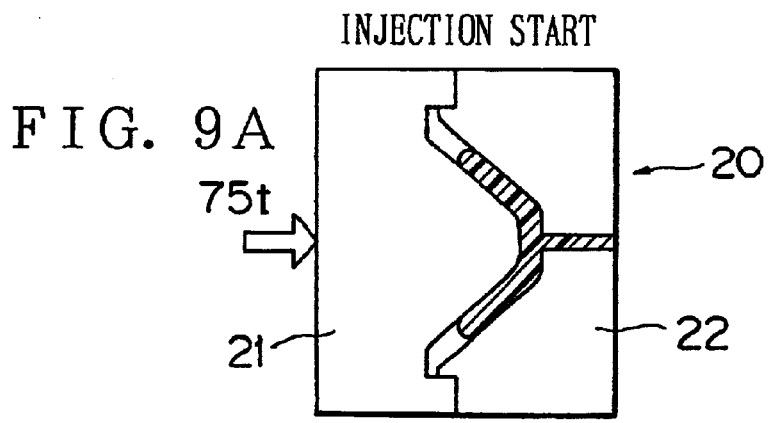
FIG. 9A INJECTION START
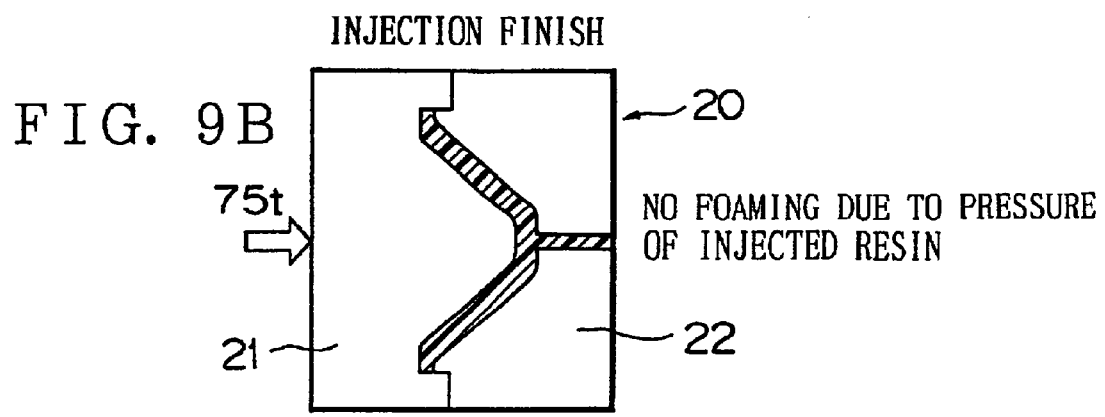
FIG. 9B INJECTION FINISH
NO FOAMING DUE TO PRESSURE OF INJECTED RESIN
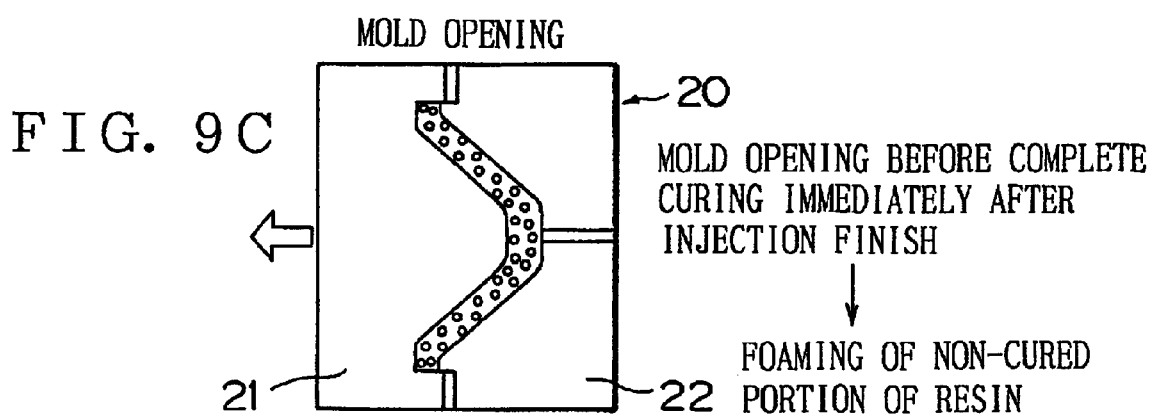
FIG. 9C MOLD OPENING
MOLD OPENING BEFORE COMPLETE CURING IMMEDIATELY AFTER INJECTION FINISH
↓
FOAMING OF NON-CURED PORTION OF RESIN

MOLDED FOAM RESIN, PROCESS FOR FORMING THE SAME AND SPEAKER DIAPHRAGM CONSISTING OF THE SAME

This is a divisional of application Ser. No. 09/519,884, filed Mar. 6, 2000, the disclosure of which is incorporated herein by reference.

BACKGROUND OF THE INVENTION (1) Field of the Invention

This invention relates to a molded foam resin formed by injection molding of foaming agent-containing resin, a process for forming the same and a speaker diaphragm produced thereof.

(2) Description of the Related Art

In Japanese Patent Application Laid-Open No. H8-207074 and H8-340594, disclosed is a process for forming a molded foam resin by injection molding using foaming agent-containing resin and a speaker diaphragm made of the molded foam resin.

In the above patent applications, there is shown process, in which a foaming agent-containing resin is injected into a mold and then, the mold is opened after a lapse of a designated period of time after the completion of the injection, during said period of time a part of the resin in the vicinity of inner surface of the mold is cured while a part of the resin distant from the inner surface of the mold is not cured, thereby allowing non-cured portion of the resin to foam upon opening of the mold, and produced are a molded foam resin and speaker diaphragm having a three layer-structure consisting of a foamed layer inside and a non-foamed skin layer outside.

The three layer-structure gives lightweight and high stiffness characteristic to the molded foam resin and speaker diaphragm.

The molded foam resin and speaker diaphragm produced according to the above process look monotone of color on their surfaces.

Recently, there has been a demand for designing the molded foam resin and speaker diaphragm with different tone of color on their surfaces.

As one of the solutions to meet with the above demand, painting the molded foam resin and the speaker diaphragm with defferent colors seems to be feasible, however, the painting causes a problem of high cost.

SUMMARY OF THE INVENTION

It is therefore an object of the present invention to solve the above problem and to provide a molded foam resin, surface of which can be designed easily at low cost, a process for forming the molded foam resin, and a speaker diaphragm.

In order to accomplish the above object, a first aspect of the present invention is to provide a molded foam resin formed by injection molding of foaming agent-containing resin, comprising a foamed zone having a three layer-structure consisting of a foamed layer inside and a non-foamed layer outside and a non-foamed zone having a single layer-structure consisting of a non-foamed layer.

A second aspect of the present invention is to provide the molded foam resin according to the first aspect of the present invention, in which thickness of the non-foamed zone is 0.5 mm or less.

A third aspect of the present invention is to provide a speaker diaphragm made of molded foam resin formed by injection molding of foaming agent-containing resin, comprising a foamed zone having a three layer-structure consisting of a foamed layer inside and a non-foamed layer outside and a non-foamed zone having a single layer-structure consisting of a non-foamed layer.

A fourth aspect of the present invention is to provide the speaker diaphragm made of molded foam resin according to the third aspect of the present invention, wherein thickness of the non-foamed zone is 0.5 mm or less.

A fifth aspect of the present invention is to provide the speaker diaphragm made of molded foam resin according to the third or fourth aspect of the present invention, wherein the speaker diaphragm is formed into a circular shape and the foamed zone is formed in such a dimension that is symmetrical with respect to a center of the speaker diaphragm.

A sixth aspect of the present invention is to provide a process for forming a molded foam resin containing foamed and non-foamed zones therein comprising the steps of injecting a foaming agent-containing resin into a mold and opening the mold after a lapse of a designated period of time after the completion of the injection, in which a cavity of the mold contains a thick space corresponding to the foamed zone and a thin space corresponding to the non-foamed zone, and the designated period of time is chosen so that a curing of the resin filled into the thin space is completed and a curing of the resin filled into the thick space is not completed.

A seventh aspect of the present invention is to provide a process for producing a molded foam resin containing foamed and non-foamed zones therein, comprising the steps of injecting a foaming agent-containing resin into a mold and opening the mold after a lapse of a designated period of time after the completion of the injection, in which a cavity of the mold contains a thick space corresponding to the foamed zone and a thin space corresponding to the non-foamed zone, and the designated period of time is chosen so that a curing of the resin filled into the thin space is completed and a curing of the resin filled into the thick space is not completed.

A eighth aspect of the present invention is to provide a process for producing a speaker diaphragm made of molded foam resin containing foamed and non-foamed zones therein, comprising the steps of injecting a foaming agent-containing resin into a mold and opening the mold after a lapse of a designated period of time after the completion of the injection, in which a cavity of the mold contains a thick space corresponding to the foamed zone and a thin space corresponding to the non-foamed zone, and the designated period of time is chosen so that a curing of the resin filled into the thin space is completed and a curing of the resin filled into the thick space is not completed.

A ninth aspect of the present invention is to provide the process for producing a speaker diaphragm made of molded foam resin according to the eighth aspect of the present invention, in which a tightening force applied to the mold is decreased after a lapse of the designated period of time.

A tenth aspect of the present invention is to provide the process for producing a speaker diaphragm made of molded foam resin according to the eighth or ninth aspect of the present invention, in which the foamed zone has a three layer-structure consisting of a foamed layer inside and a non-foamed layer outside and the non-foamed zone has a single layer-structure consisting of a non-foamed layer.

Thus, according to the present invention, provided are a molded foam resin and a speaker diaphragm that can be thinned, designed with different tone of color on surfaces thereof and lightened without deteriorating stiffness thereof, since they are produced in such a manner that they have a foamed zone having a three layer-structure consisting of a foamed layer inside and a non-foamed layer outside and a non-foamed zone having a single layer-structure consisting of a non-foamed layer.

In addition, the molded foam resin and the speaker diaphragm, structures of which are described above, can be easily obtained by the injection molding according to the present invention.

BRIEF DESCRIPTION OF THE DRAWINGS

FIGS. 9A, 9B and 9C are schematic illustration of molding process for producing a speaker diaphragm according to the present invention.

DESCRIPTION OF THE PREFERRED EMBODIMENTS

In the following, the preferred embodiments of the present invention are explained with reference to the attached drawings.

Figure 1:
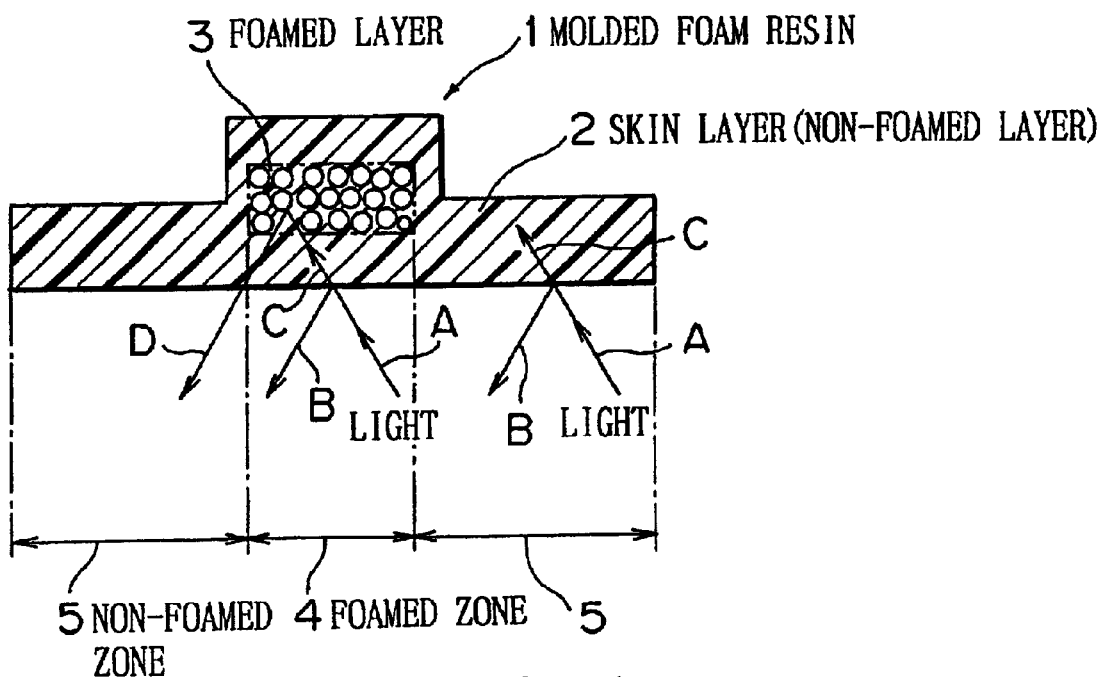
FIG. 1 is a sectional view of a molded foam resin according to the present invention.

FIG. 1 is a sectional view of a molded foam resin according to the present invention, in which a molded foam resin 1 has a foamed zone 4 formed to have a three layer-structure consisting of a foamed layer 3 inside and a non-foamed layer (skin layer 2) outside and a non-foamed zone 5 formed to have a single layer-structure consisting of a non-foamed layer (skin layer 2).

As shown in FIG. 1, when a light A is irradiated to the molded foam resin 1, a part of the light A is reflected on the surface to become a reflected light B, while the rest of the light A becomes a transmitted light C that permeates into the molded foam resin 1.

In the non-foamed zone 5, the transmitted light C keeps to permeate through the molded foam resin 1, resulting in that the non-foamed zone 5 gives a color tone of the reflected light B, which depends upon a resin.

On the other hand, in the foamed zone 4, the transmitted light C is irregularly reflected on the surface of foams contained in the foamed layer 3, therefore the irregularly reflected light D is added to the reflected light B, resulting in that a color tone given by the foamed zone 4 becomes an opaque white light.

Consequently, designing of the molded foam resin 1 with different tone of color on the surface can be achieved by such a manner that the molded foam resin 1 is composed of the foamed zone 4 and the non-foamed zone 5 corresponding to a desired distribution thereof.

In the following, the preferred embodiments of the process for forming the molded foam resin are explained. The process according to the present invention enables simple forming of the molded foam resin containing the foamed zone and non-foamed zone without using a complicated mold. A process for forming a molded foam resin having a three-layer structure as a whole will be explained with reference to FIGS. 2A–2C and then, a process for forming the molded foam resin having foamed zone and non-foamed zone simultaneously as a whole will be explained with reference to FIGS. 3 and 4A–4D from the viewpoint of a relation between molded foam resin to be formed and a period of time elapsed between the completion of resin filling and the opening of the mold.

As shown in FIG. 2, a mold 20 is composed of a movable mold 21 and a fixed mold 22, by which a cavity 6 is formed. A tightening force applied to the molds 21 and 22 is controlled by a tightening pressure controller that is not shown in the figure. The cavity 6 has a uniform width so as to form a molded foam resin having uniform thickness.

Figure 2A:
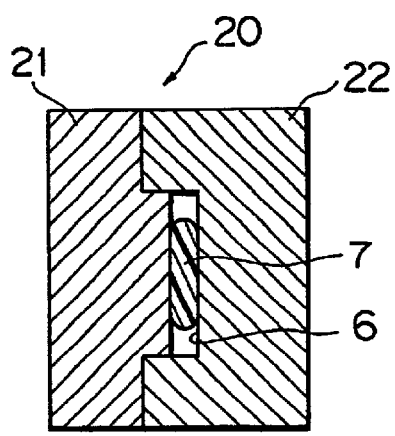
FIGS. 2A, 2B and 2C are sections of a mold for illustrating a principle of the present invention.
Figure 2B:
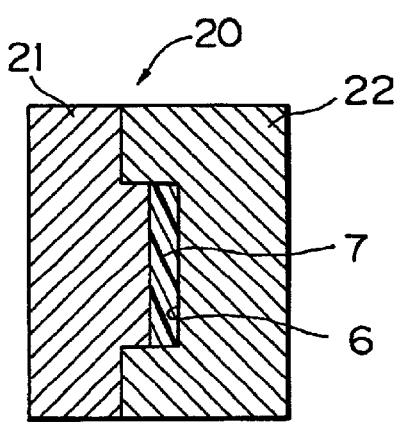

At the beginning of an injection molding, a foaming agent-containing resin 7 is injected into the cavity 6 of the mold as shown in FIG. 2A, and filled up in the cavity 6 as shown in FIG. 2B.

Figure 2C:
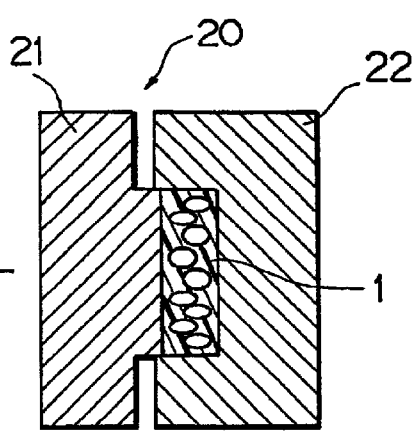

In this state, a portion of resin in contact with the mold 20 starts to cure to form a skin layer there, while a foaming is restricted for molten portion of resin in the cavity 6, since a gas generated by decomposition of the foaming agent is compressed because the tightening pressure controller applies a tightening pressure to the molds 20. After a designated period of time and the skin layer with an appropriate thickness is formed, the tightening pressure applied to the mold 20 is lowered and the mold 20 is opened, resulting in that a foaming of molten portion of resin in the cavity 6 is promoted to form a foamed layer, as shown in FIG. 2C. Accordingly, a molded foam resin having a three layer-structure consisting of a foamed layer inside and a non-foamed layer outside is formed.

Regarding the formation of the molded foam resin having a three layer-structure, the follows are the molded foam resin obtained by changing a period of time between the completion of resin filling into the mold 20 and the opening of the mold 20.

Figure 3:
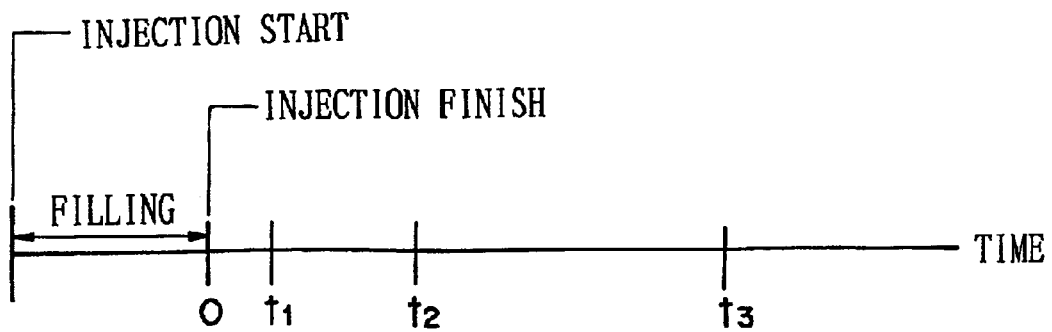
FIG. 3 is a time-scale diagram for illustrating a principle of the present invention.
Figure 4A:
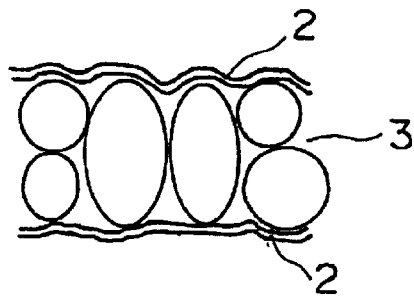
FIGS. 4A, 4B, 4C and 4D are schematic illustrations of resin curing for representing a principle of the present invention.

In FIG. 3, when the movable mold 21 is opened within a time $t_1$ elapsed from the completion of resin filling into the mold, formed is a foam having a three layer-structure consisting of thin cured skin layer 2 and thick foamed layer 3 having large volume, as shown in FIG. 4A.

Figure 4B:
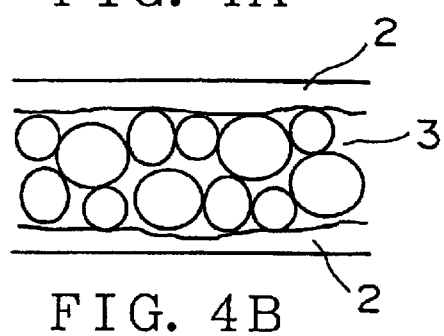

In FIG. 3, when the movable mold 21 is opened at a time between $t_1$ and $t_2$, as shown in FIG. 4B, formed is a molded foam resin having a three layer-structure consisting of a skin layer 2, which is thicker than that shown in FIG. 4A, and a foamed layer 3 inside the molded foam resin. The molded foam resin in this state as illustrated in FIG. 4B is most preferable.

Figure 4C:
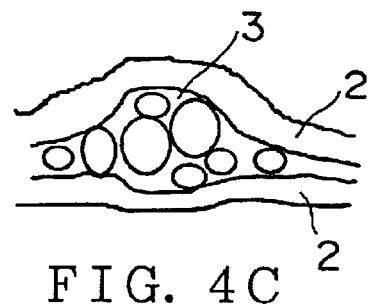

In FIG. 3, when the movable mold 21 is opened at a time between $t_2$ and $t_3$, as shown in FIG. 4C, formed is a molded foam resin consisting of a further thicker skin layer 2 compared to that shown in FIG. 4B and a foamed layer 3 consisting of less amount compared to that shown in FIG. 4B. Consequently, a portion having capability of foaming turns to a foamed layer to a certain extent, while a portion having weak capability of foaming cures without foaming.

Figure 4D:
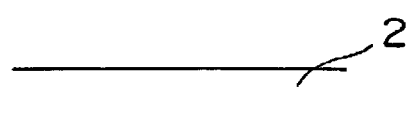

In FIG. 3, when the movable mold 21 is opened after a time $t_3$, as shown in FIG. 4D, formed is a molded foam resin consisting of only a skin layer 2, since almost all the portion is cured.

As described above, the skin layer 2 can be formed to be thick by elongating a period of time between the completion of the injection and the opening of the mold. Since a formation rate of the skin layer 2 depends upon the resin used, a period of time, which is elapsed between the completion of the injection and the forming of a molded foam resin having a single layer-structure consisting of only a skin layer by curing a whole resin injected in the cavity, can be changed. The process according to the present invention is curried out by utilizing this phenomenon, which is explained in detail with reference to FIGS. 5 and 6 in the following.

Figure 5:
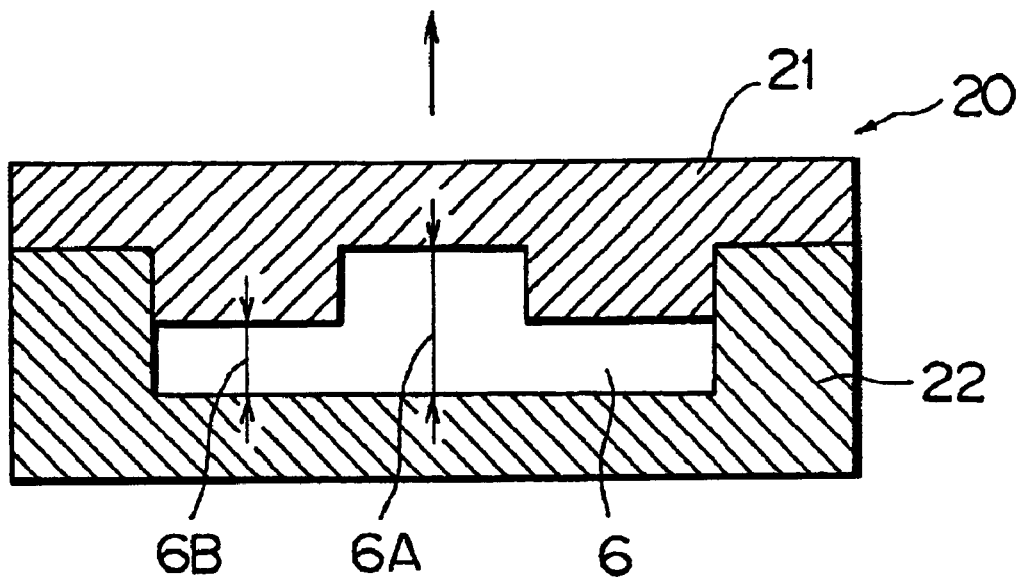
FIG. 5 is a sectional view of a mold according to the present invention.

In FIG. 5, shown is a mold 20, by which the foamed zone 4 and non-foamed zone 5 are simultaneously formed in the molded foam resin 1.

As shown in FIG. 5, regarding a shape of the cavity 6 in the mold 20, a width 6A corresponding to a thickness of the foamed zone 4 of the molded foam resin 1 is formed to be larger than a width 6B corresponding to a thickness of the non-foamed zone 5.

Figure 6:
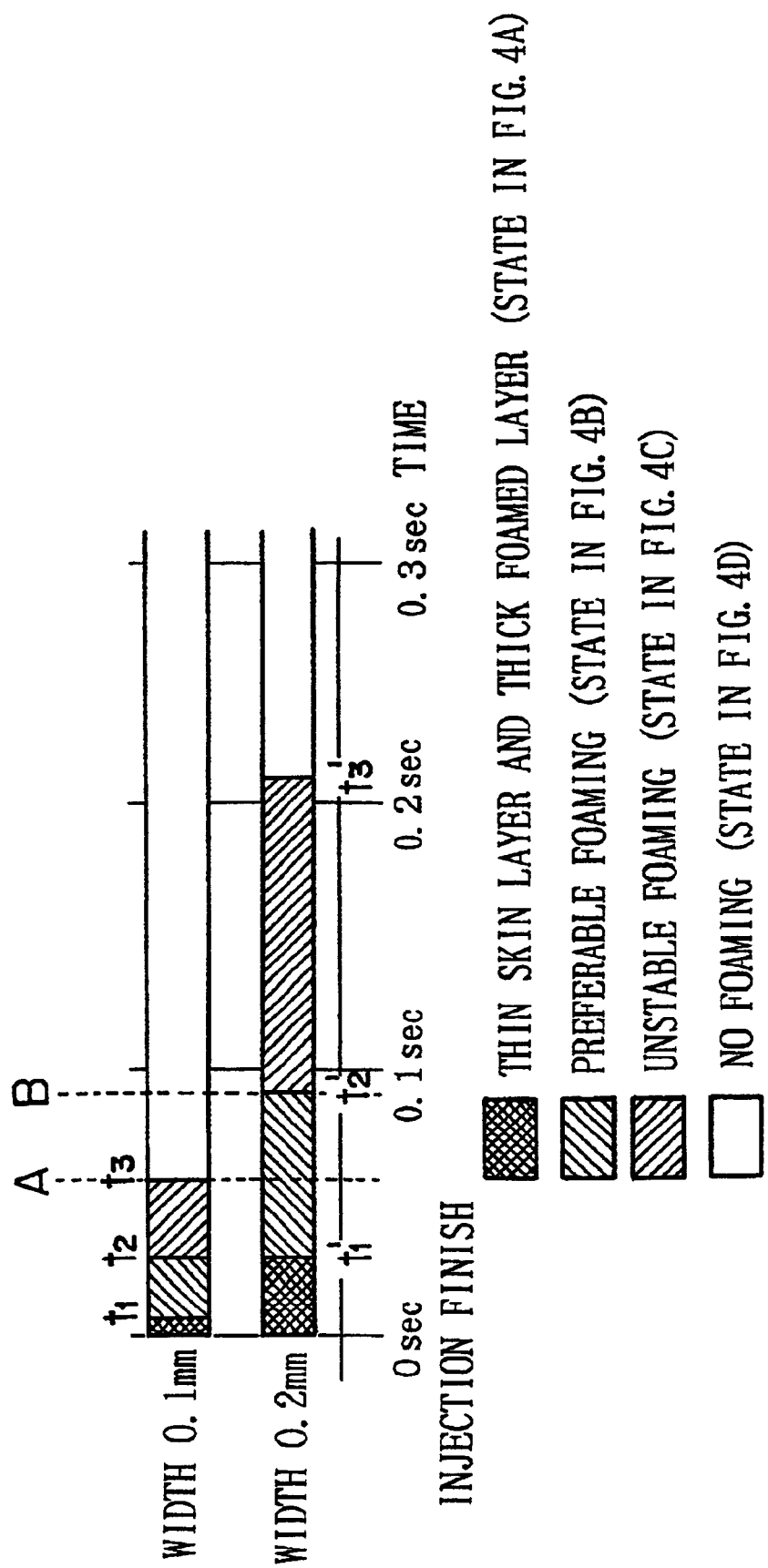
FIG. 6 is a diagram for representing a timing of mold opening according to the present invention.

After the foaming agent-containing resin 7 is filled into the cavity 6 in the above mold 20, a state of the resin 7 varies with a lapse of time as shown in FIG. 6. In this figure, a width 0.1 mm corresponds to the width 6B of the cavity 6 in FIG. 5 and a width 0.2 mm to the width 6A.

The above-mentioned times $t_1$, $t_2$ and $t_3$ depend upon a width of the cavity 6 and increase with increasing the width.

In FIG. 6, times $t_1$, $t_2$ and $t_3$ corresponding to the width 0.1 mm of the cavity 6 are longer than times $t_1'$, $t_2'$ and $t_3'$ corresponding to the width 0.2 mm of the cavity 6, respectively.

Consequently, a preferable molded foam resin 1, such as a foam shown in FIG. 1, can be obtained when the movable mold 21 is opened after a lapse of time (i.e. at a time lying between A and B shown in FIG. 6), which is not shorter than $t_3$ that gives the non-foamed zone 5 of thickness 6B (see FIG. 5) having a single-layer structure consisting of a skin layer (non-foamed layer) due to a total curing and also is not longer than $t_2'$ that gives the foamed zone 4 of thickness 6A having a desirable three-layer structure consisting of skin layers and a foamed layer.

In the following, an example of preferred embodiments for forming a speaker diaphragm by using the molded foam resin is explained with reference to FIGS. 7 to 9.

Figure 7A:
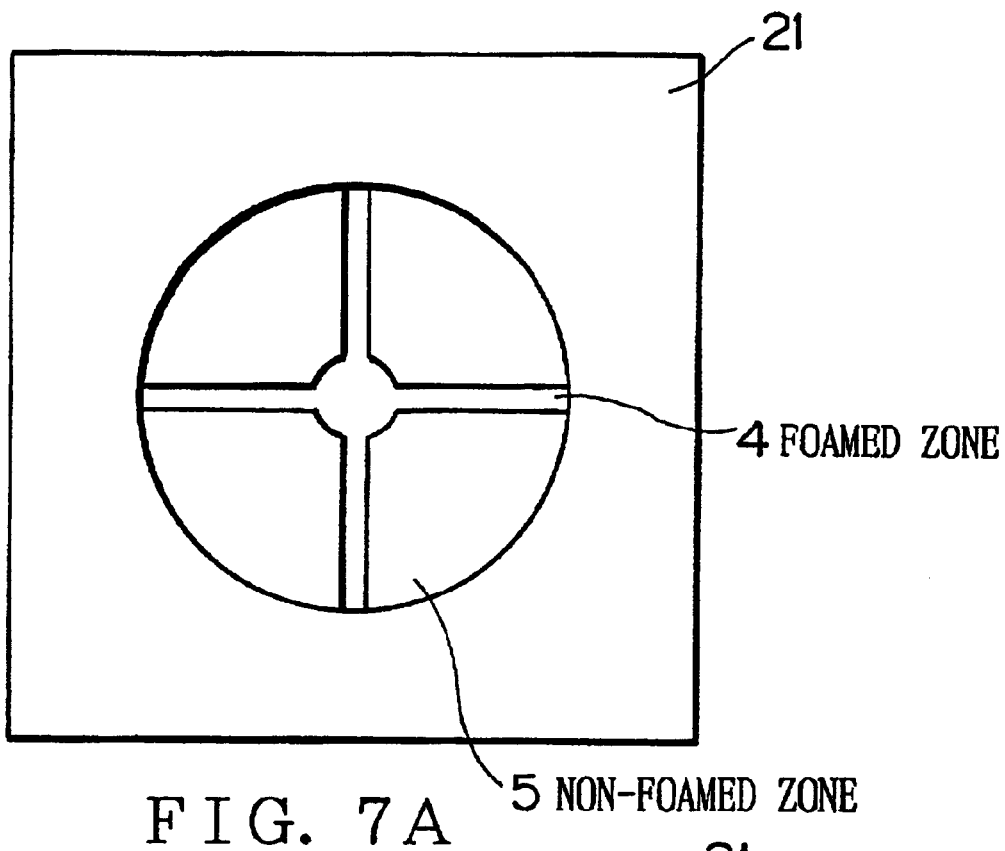
FIGS. 7A and 7B are front elevations of a movable mold for molding a speaker diaphragm according to the present invention.
Figure 7B:
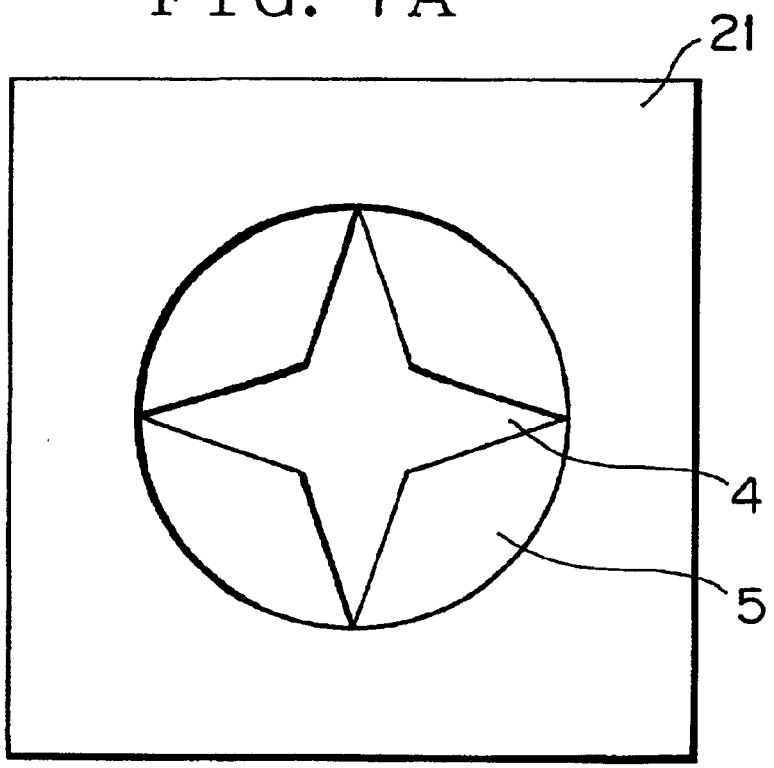

FIGS. 7A and 7B are examples of a front elevation of a movable mold 21 for molding a speaker diaphragm, in which a whole shape is formed in a circle. In FIG. 7A, a vicinity of a center and four portions that extend radially from the center are formed to be the foamed zone 4, giving a wide width to a cavity there, and the rest of the portion are formed to be the non-foamed zone 5. In FIG. 7B, another example of the movable mold having a different configuration is shown. Thus, a speaker diaphragm, which is reinforced in order to obtain a desirable acoustic characteristic, can be produced by changing the configuration and thus, designing of a diagram on the diaphragm is possible.

Figure 8:
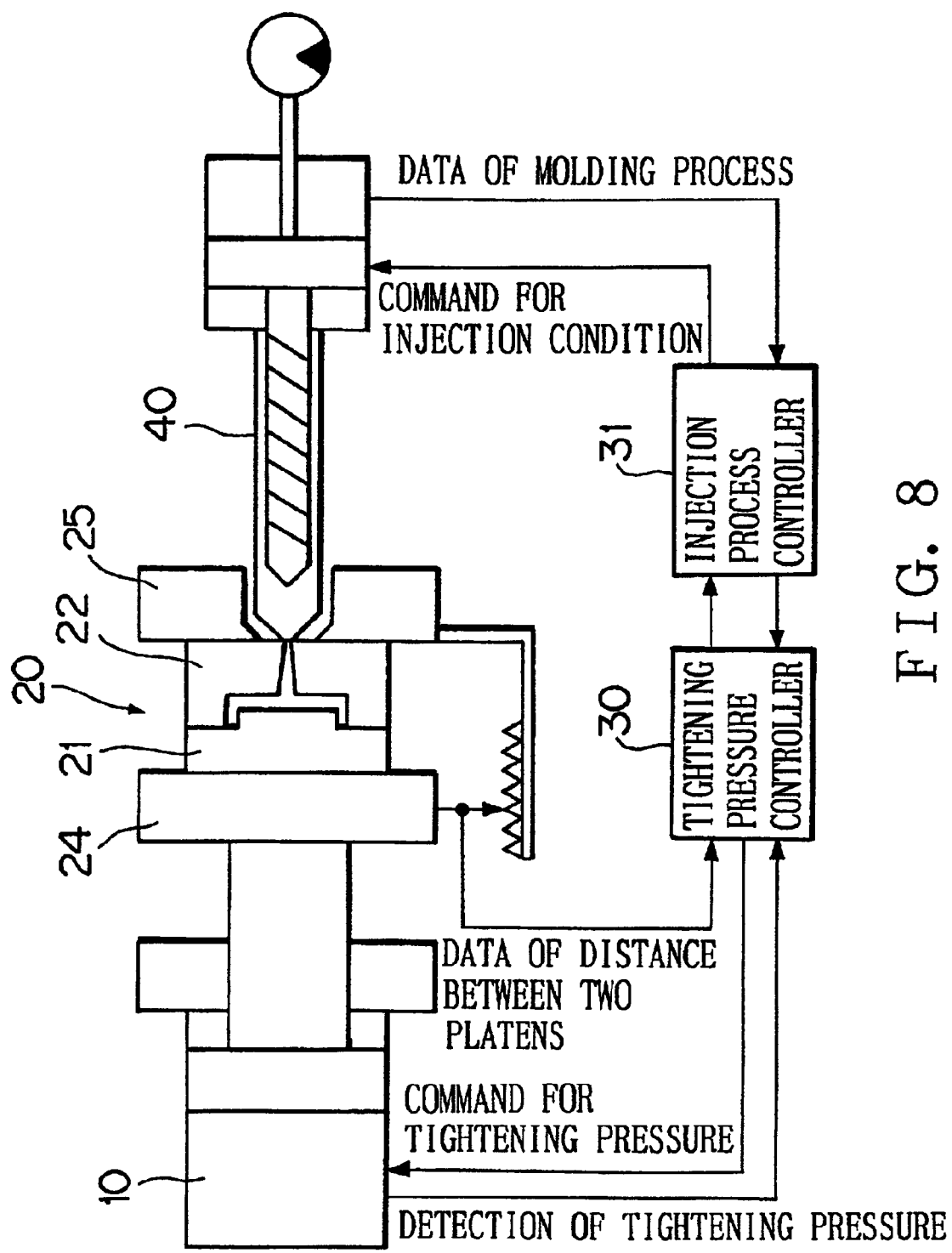
FIG. 8 is a schematic illustration of an injection molding machine regarding an example of molding process for forming a molded foam resin according to the present invention.

FIG. 8 is a schematic illustration of an injection molding machine for producing a speaker diaphragm 1 made by a molded foam resin.

A tightening pressure applied between the movable mold 21 held by a movable platen 24 of the mold 20 and the fixed mold 22 held by a fixed platen 25 is adjusted by a cylinder 10, which is used for tightening mold and is controlled by a tightening pressure controller 30.

An injection outlet of the injection unit 40, from which a resin compound consisted of foaming agent-added polypropylene is injected, is fitted into an injection inlet of the fixed mold 22. The injection unit 40 is controlled in accordance with an injection condition controlled by a injection process controller 31. The injection unit 40 outputs data for the injection process, in accordance with which the tightening pressure controller 30 controls a tightening pressure applied to the mold, together in accordance with data of a distance between the above two platens, which is detected at the movable platen 24.

In the following, a process for producing a speaker diaphragm by using the injection molding machine constructed as mentioned above is explained with reference to FIGS. 9A to 9C.

At the beginning, as shown in FIG. 9A, the movable mold 21 and the fixed mold 22 of the mold 20 are closed by the cylinder 10 and then, the resin compound consisted of foaming agent-added polypropylene is injected from the injection unit 40.

At this time, the resin compound is kept at about 240° C. and a cavity-side (i.e. inner) surface of the mold 20 is kept at about 90° C. A tightening force applied by the cylinder 10 controlled by the tightening pressure controller 30 is kept at around 100 tons. Widths of the cavity, which are formed in accodance with the configurations of the movable mold 21 and the fixed mold 22 of the mold 20, are about 0.22 mm for the corresponding foamed zone 4 and about 0.1 mm for the corresponding non-foamed zone 5.

Then, as shown in FIG. 9B, a portion of the resin compound in contact with the mold 20 starts to cure to form a skin layer 2 there and thus, a molten portion of the resin compound keeps curing while the foaming is restricted, since a gas generated by decomposition of the foaming agent is compressed because a pressure due to the injected resin and the tightening pressure given by the movable mold 21 and fixed mold 22 are together applied to the molten portion of the resin compound.

Then, as shown in FIG. 9C, immediately after the completion of filling of the resin compound, when a foaming capability of the foaming agent in the molten portion is still high enough to push the surrounding skin layer (cured portion) around, the tightening pressure controlled by the cylinder 10 is instantaneously lowered down to around 0 ton, thereby the decomposed gas from the foaming agent in the molten portion of the resin compound, which has been compressed, expands with pushing the surrounding resin around, i.e. starts foaming.

In the following, timing for the opening of the movable mold 21 is explained. If the movable mold 21 is opened before the completion of filling of the resin compound, an excess amount of the resin compound is injected into the cavity 6, resulting in that a product has undesirably excess weight. On the other hand, if the timing for the opening of the movable mold 21 is too late, the curing of the resin proceeds too much, resulting in that the resin completely cures before the foaming agent proceeds any foaming.

Therefore, a preferable timing for the opening of the movable mold in an example is after a lapse of 0.10 to 0.15 sec after the completion of resin filling, and this is the timing when the curing is finished in the non-foamed zone 5 and also a desirable foaming can take place in the zone 4 to be foamed. However, the preferable timing depends upon conditions such as temperature of the resin compound and the mold 20, thickness of the product and the added amount of the foaming agent.

When the mold 20 is opened, a size of the opening is preferably about 0.5 mm, thereby a molded foam resin is formed, in which a thickness of the foamed zone is about 0.5 mm and a thickness of the non-foamed zone is 0.1 mm that is equal to the width of the cavity there before opening of the mold. The foaming agent, a spring (explained later) for opening the mold and the tightening pressure applied to the mold are controlled in such a manner that the mold is opened at a rate of about 2.5 mm/sec.

Further, a foaming of the molded foam resin can be promoted by buring a spring between the movable mold 21 and the fixed mold 22 so that a movement of the movable mold 21 is further promoted when the tightening pressure applied to the mold is decreased.

In the following, explained are the injection molding machine, the resin compound and the foaming agent employed in an example of the preffered embodiments. Polypropylene (MA04, manufactured by Mitsubishi Chemical Corporation) added by 5 wt % of glass fiber and 5 wt % of mica was used as the resin compound. To the resin compound, 0.1 wt % of foaming agent (EE-206, manufactured by Eiwa Chemical Ind. Co., LTD) was added. The width of the cavity was 0.30 mm for 6A (see FIG. 5) corresponding to the foamed zone 4 and 0.15 mm for 6B corresponding to the non-foamed zone 5. As the injection molding machine, Ultra 220 manufactured by Sumitomo Heavy Industries, Ltd. was employed.

According to the aforementioned process for forming a molded foam resin, obtained was a cone-shaped molded foam resin, in which a thickness of the foamed zone 4 became 0.50 mm, 1.7 times of the corresponding width of the cavity, as a result of the foaming, and a thickness of the non-foamed zone 5 was 0.15 mm that was equal to the other corresponding width of the cavity. The foamed zone 4 had a three-layer structure consisting of a skin layer outside and the foamed layer inside, and looked white-opaque due to an irregular reflection at the foamed layer. On the other hand, the non-foamed zone 5 had a single layer-structure consisting of a skin layer and was formed as a semitransparent film of polypropylene. Thus, the foamed zone 4 looked differently from the non-foamed zone 5 with respect to a color tone, i.e. a desired designing was attained.

In the above preferred embodiment, the resin compound consisting of foaming agent-added polypropylene was injected into the cavity between the movable mold 21, to which a tightening pressure was applied, and the fixed mold 22 from the injection unit 40 and then, the tightening pressure was decreased to open the mold and to promote foaming of the foaming agent.

Thus, a speaker diaphragm was formed by foaming of the foaming agent that was added into the resin, resulting in that the density of the speaker diaphragm was decreased without deteriorating stiffness thereof.

The speaker diaphragm according to the present invention has a superior acoustic characteristic compared to a conventional speaker diaphragm, which is formed in such a manner that a whole diaphragm consists of a foamed zone. In the following, an advantage and disadvantage of a conventional diaphragm made by molded foam resin are explained. In general, stiffness of a material is proportional to Young's modulus and the cube of thickness thereof. A conventional diaphragm made of the molded foam resin has achieved preferable lightness as well as high stiffness by decreasing the density and increasing the thickness thereof, and also achieved no distortion in sound and no sympathetic vibration upon high power operation since a crossover resonant frequency can be shifted to high frequency region.

Figure 10:
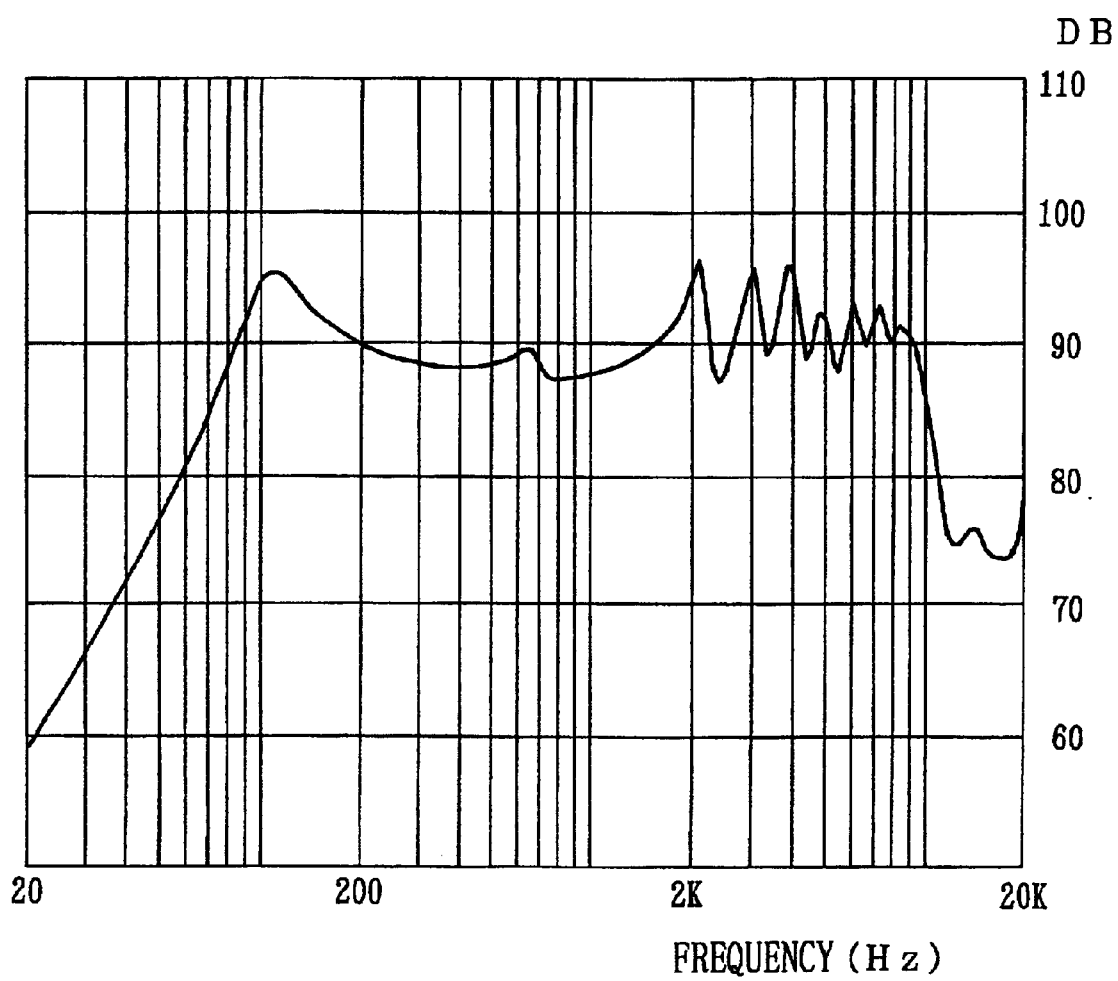
FIG. 10 is an example of frequency characteristic for a conventional speaker diaphragm consisted of only a non-foamed zone.
Figure 11:
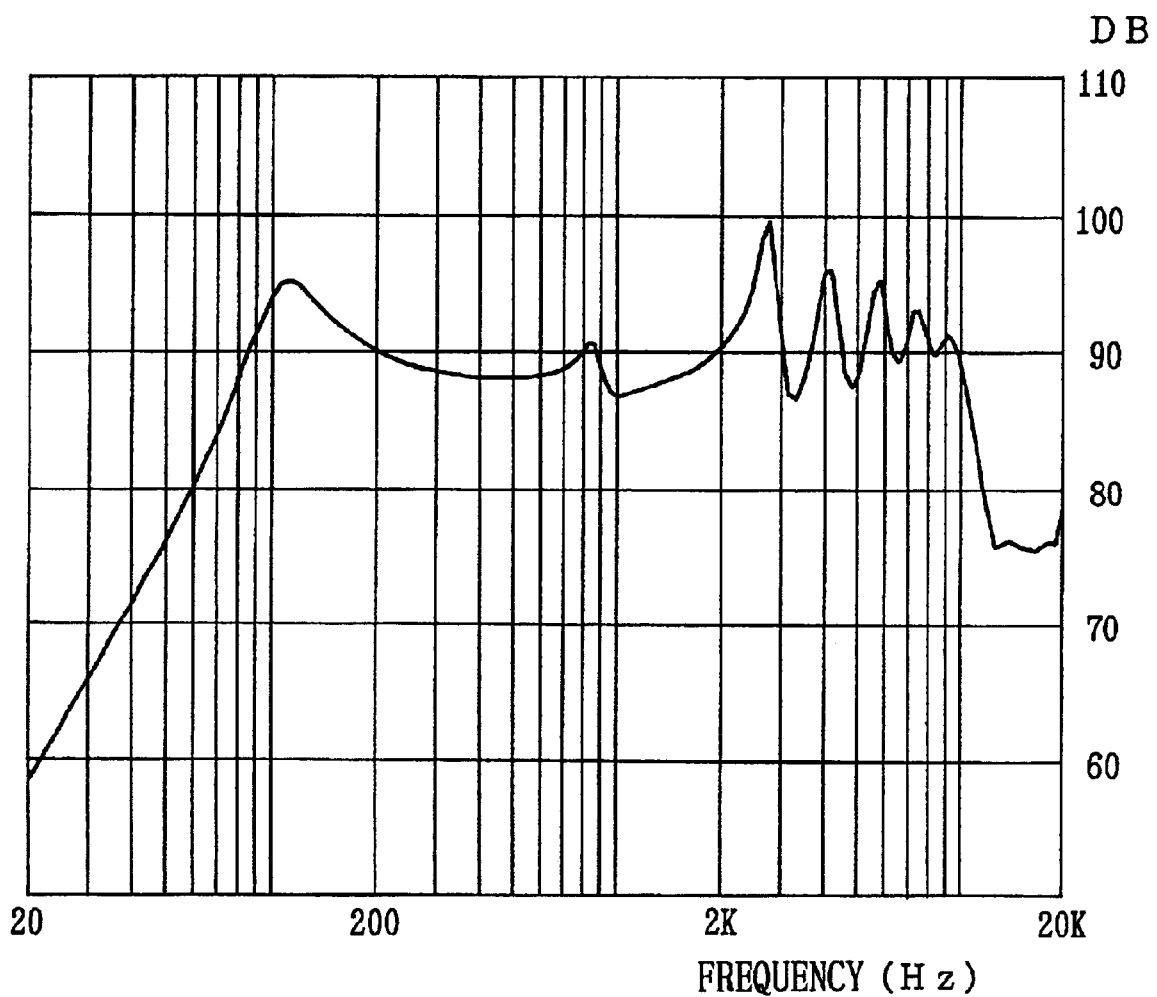
FIG. 11 is an example of frequency characteristic for a conventional speaker diaphragm consisted of only a foamed zone.

However, the conventional diaphragm has a disadvantage that a peak dip becomes large upon occurrence of crossover resonance. FIG. 10 is a frequency characteristic for a conventional speaker diaphragm consisted of only a non-foamed zone. FIG. 11 is a frequency characteristic for a conventional speaker diaphragm consisted of only a foamed zone, diameter and weight of which are the same as the diaphragm consisted of only a non-foamed zone. As seen in FIGS. 10 and 11, regarding the conventional diaphragm made by molded foam resin, a level of crossover resonance generated at high frequency region is large.

According to the present invention, through the process in such a manner that foaming takes place with respect to a part of the diaphragm, obtained is the diaphragm made of molded foam resin, which is light and highly stiff and also, restrains a level of crossover resonance. As an actual example, as shown in FIG. 7A, the foamed zone 4 can preferably be formed in a rib-shape extended radially from a center of a circle, thereby raises stiffness of the diaphragm due to a partial formation of the foamed zone. Moreover, in such a case, weight of the diaphragm hardly increases, causing no deterioration with respect to the high frequency characteristics.

According to the present invention, the width (6B in FIG. 5) of the cavity 6 corresponding to the non-foamed zone 5 is preferably 0.5 mm or less in order to obtain a molded foam resin, which has light weight and high stiffness. If the width is more than 0.5 mm, it takes a long period of time ($t_3$ in FIG. 6) for the non-foamed zone to complete curing of the resin compound, since a period of time for unstable foaming (from $t_2$ to $t_3$ in FIG. 6) becomes long. In such a case, the width (6A in FIG. 5) of the cavity 6 corresponding to the foamed zone 4 should be set to be, for example, three times as long as the width (6B) of the cavity 6 corresponding to the above non-foamed zone 5 in order to promote a preferable foaming for the foamed zone 4, resulting in that the molded foam resin becomes unpreferably heavy. Furthermore, in such a case, it becomes difficult to control the foaming of the foaming agent using a pressure applied by the injected resin and accordingly, a transparency of the non-foamed zone is deteriorated since fine foams are easily generated due to a fluctuation in conditions of the injection molding.

A spring was used to open the movable mold 21 in the above preferred embodiment, but the use of a spring can be replaced by a use of some mechanical method.

In the above preferred embodiment, the resin was injected and filled into the mold with closing the mold 20. Instead of that, the following process can be employed: the mold 20 is opened to some extent before the injection of the resin, then a certain amount of the resin is injected and then, the mold is closed to fill the resin and finally, the mold is opened to promote the foaming of the resin. Thereby, a uniform filling of the resin into a thin cavity can be achieved and thus obtained molded foam resin has no deformation.

Figure 12:
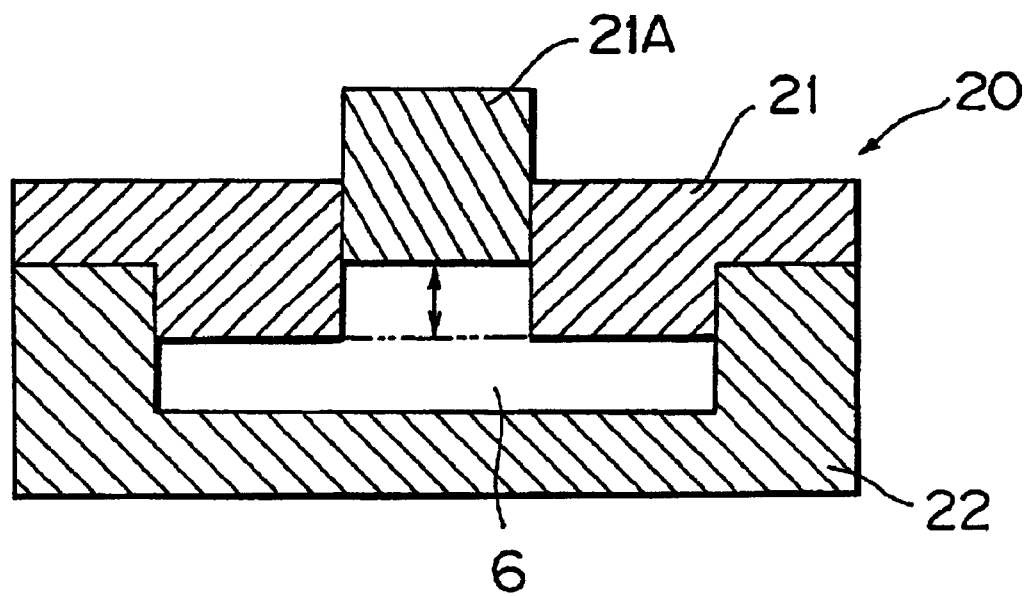
FIG. 12 is a sectional view of another mold according to the present invention.

In the above preferred embodiment, as shown in FIG. 5, the cavity 6 of the mold 20 has two different widths corresponding to the foamed and non-foamed zones. Instead of that, as shown in FIG. 12, a mold can be designed in such a manner that only a portion 21A corresponding to the foamed zone is movable so that the portion 21A can be opened during a period of time between $t_1$ and $t_2$ shown in FIG. 3. However, in this case, if the required design of the molded foam resin is complicated, making of the mold 20 becomes hard and the cost of the making becomes high as well. Therefore, in such a case, a type of the mold shown in FIG. 5 is comparatively preferable.

What is claimed is:

1. A process for forming a molded foam resin containing foamed and non-foamed zones therein comprising:

injecting a foaming agent-containing resin into a mold; and opening the mold after a lapse of a designated period of time after the completion of the injection, wherein a cavity of the mold contains a thick space corresponding to the foamed zone and a thin space corresponding to the non-foamed zone, and the designated period of time is chosen so that a curing of the resin filled into the thin space is completed and a curing of the resin filled into the thick space is not completed.

2. A process for producing a molded foam resin containing foamed and non-foamed zones therein comprising:

injecting a foaming agent-containing resin into a mold; and opening the mold after a lapse of a designated period of time after the completion of the injection, wherein a cavity of the mold contains a thick space corresponding to the foamed zone and a thin space corresponding to the non-foamed zone, and the designated period of time is chosen so that a curing of the resin filled into the thin space is completed and a curing of the resin filled into the thick space is not completed; and wherein the thick space is defined by opposing sides of the mold and the thin space is defined by opposing sides of the mold.

3. A process for producing a speaker diaphragm made of molded foam resin containing foamed and non-foamed zones therein comprising:

injecting a foaming agent-containing resin into a mold; and opening the mold after a lapse of a designated period of time after the completion of the injection, wherein a cavity of the mold contains a thick space corresponding to the foamed zone and a thin space corresponding to the non-foamed zone, and the designated period of time is chosen so that a curing of the resin filled into the thin space is completed and a curing of the resin filled into the thick space is not completed.

4. The process for producing a speaker diaphragm made of molded foam resin according to claim 3, wherein a tightening force applied to the mold is decreased after the lapse of the designated period of time.

5. The process for producing a speaker diaphragm made of molded foam resin according to claim 3 or 4, wherein the foamed zone has a three layer-structure consisting of a foamed inside and a non-foamed layer outside, and the non-foamed zone has a single layer-structure consisting of a non-foamed layer.

* * * * *